(12) United States Patent
Khosravani et al.

(10) Patent No.: US 9,669,942 B2
(45) Date of Patent: Jun. 6, 2017

(54) LIGHTNING DAMAGE RESISTANT AIRCRAFT SKIN FASTENERS

(71) Applicant: The Boeing Company, Chicago, IL (US)

(72) Inventors: Shahriar Khosravani, Everett, WA (US); Poh Soong Tang, Bothell, WA (US); Omid B. Nakhjavani, Kirkland, WA (US); Hamid Jamshidiat, Bellevue, WA (US); Darrin M. Hansen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 14/684,181

(22) Filed: Apr. 10, 2015

(65) Prior Publication Data

US 2016/0297542 A1    Oct. 13, 2016

(51) Int. Cl.
| | | |
|---|---|---|
| *B64D 45/02* | (2006.01) | |
| *F16B 35/04* | (2006.01) | |
| *F16B 5/02* | (2006.01) | |
| *F16B 33/00* | (2006.01) | |

(52) U.S. Cl.
CPC ............ *B64D 45/02* (2013.01); *F16B 35/041* (2013.01); *F16B 5/02* (2013.01); *F16B 33/004* (2013.01)

(58) Field of Classification Search
CPC . B64D 45/02; H05F 3/00; B60R 16/06; F16B 35/04; F16B 35/041; F16B 35/06
See application file for complete search history.

(56) References Cited

U.S. PATENT DOCUMENTS

| | | | | |
|---|---|---|---|---|
| 388,000 A | * | 8/1888 | Rider ..................... | F16B 35/06 411/399 |
| 586,232 A | * | 7/1897 | English .................. | F16B 35/06 411/399 |
| 877,131 A | * | 1/1908 | Searelle ................. | F16B 35/06 411/399 |

(Continued)

FOREIGN PATENT DOCUMENTS

| | | |
|---|---|---|
| EP | 1 484 516 | 12/2004 |
| FR | 2 920 598 | 3/2009 |

(Continued)

*Primary Examiner* — Joseph W Sanderson
(74) *Attorney, Agent, or Firm* — Haynes and Boone, LLC

(57) ABSTRACT

A fastener providing protection against damage to an aircraft resulting from lightning strikes includes an elongated shaft having a head disposed at an upper end thereof, one, the other, or both of the shaft and the head containing a circumferential groove disposed proximate an intersection of the shaft and the head, a lower surface of the head including a plurality of grooves extending radially outward from the circumferential groove and terminating at an outer periphery of the lower surface. A tubular sleeve is disposed concentrically about the shaft and has a plurality of through-slots disposed therein. Each through-slot has a lower end disposed above a lower end of the sleeve, and an upper end disposed in fluid communication with the circumferential groove, such that superheated gases and particles generated in interfaces between the fastener and the adjacent skin due to lightning strikes are vented harmlessly to the atmosphere through the channels and grooves.

21 Claims, 4 Drawing Sheets

(56) References Cited

U.S. PATENT DOCUMENTS

| | | | |
|---|---|---|---|
| 1,151,861 A * | 8/1915 | Brumback | F16B 35/06 411/399 |
| 2,237,236 A * | 4/1941 | Matthews | F16B 35/06 411/396 |
| 2,895,368 A * | 7/1959 | Trigg, Jr. | F16B 35/041 411/392 |
| 4,479,163 A | 10/1984 | Bannink, Jr. et al. | |
| 4,502,092 A | 2/1985 | Bannink, Jr. et al. | |
| 4,712,957 A * | 12/1987 | Edwards | F16B 35/04 411/258 |
| 4,755,904 A * | 7/1988 | Brick | B64D 45/02 244/1 A |
| 4,760,493 A | 7/1988 | Pearson | |
| 6,190,102 B1 * | 2/2001 | Vignotto | B60B 3/165 301/105.1 |
| 7,050,286 B2 | 5/2006 | Pridham et al. | |
| 7,277,266 B1 | 10/2007 | Le et al. | |
| 7,307,825 B2 | 12/2007 | De la Fuente De Ana et al. | |
| 7,329,077 B2 * | 2/2008 | Curtis | F16B 33/004 411/188 |
| 7,554,785 B2 | 6/2009 | Hawley | |
| 7,686,905 B2 * | 3/2010 | Ackerman | B29C 73/10 156/94 |
| 7,721,996 B2 | 5/2010 | Gehrett et al. | |
| 8,004,815 B2 | 8/2011 | Loche et al. | |
| 8,240,945 B2 * | 8/2012 | Adoum | F16B 35/041 403/365 |
| 8,436,243 B2 | 5/2013 | Gattus et al. | |
| 8,462,481 B2 | 6/2013 | Lambert et al. | |
| 8,475,102 B2 * | 7/2013 | Haylock | B64D 45/02 411/361 |
| 2003/0108403 A1 * | 6/2003 | Scoyoc | F16B 35/041 411/421 |
| 2005/0213278 A1 | 9/2005 | Hawley | |
| 2007/0177330 A1 * | 8/2007 | Ackerman | B29C 73/10 361/220 |
| 2007/0237606 A1 * | 10/2007 | Takasaki | F16B 25/0015 411/387.2 |
| 2010/0196120 A1 * | 8/2010 | Davies | F16B 35/06 411/378 |

FOREIGN PATENT DOCUMENTS

| | | |
|---|---|---|
| GB | 2 226 801 | 7/1990 |
| WO | WO 2014/150253 | 9/2014 |

* cited by examiner

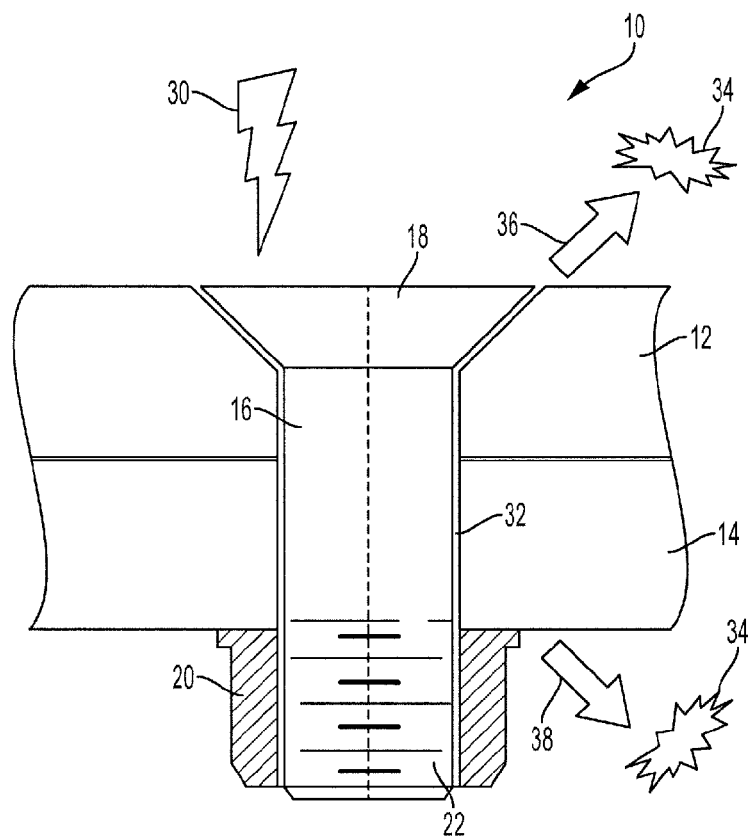
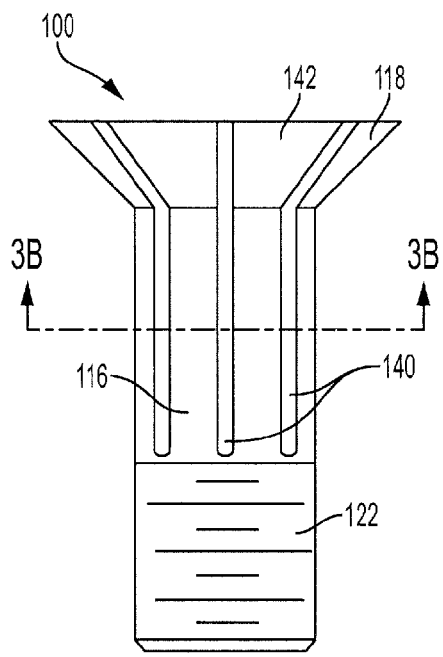 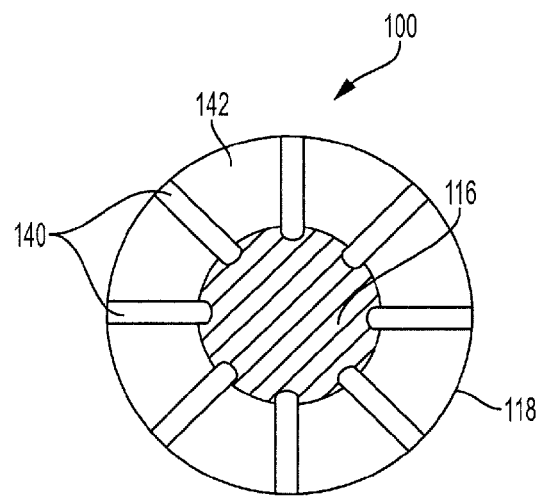
FIG. 2
PRIOR ART
FIG. 3A  FIG. 3B

LIGHTNING DAMAGE RESISTANT AIRCRAFT SKIN FASTENERS

BACKGROUND

Technical Field

This disclosure relates to fasteners in general, and in particular, to aircraft skin fasteners that provide resistance to electromagnetic effect (EME) related internal damage to aircraft resulting from lightning strikes.

Related Art

In an ideal case, the EMEs of a lightning strike on an aircraft are limited to the theoretically continuous, electroconductive exterior skin thereof, in the manner of a so-called "Faraday Cage," such that the interior of the aircraft should be relatively unaffected by the strike. However, as a practical matter, the skin, made of numerous individual panels, is actually discontinuous, and further, is pierced by a relatively large number of typically electroconductive fasteners, such as lock bolts, rivets or the like, used to attach the skin panels to associated structures, such as ribs, spars, stringers and the like. As a result, the ideal model does not hold true, and it therefore becomes desirable to develop designs and methods for protecting interior spaces of aircraft from EME-related damage resulting from lightning strikes.

FIG. 1 is lower, side perspective view illustrating a conventional "lock bolt" fastener 10, such as a HI-LOK fastener, of a known type typically used to fasten a skin panel 12 of an aircraft to an associated structure 14, such as a wing rib, spar, stringer, longeron, frame or the like, and some sequential steps involved in the attachment of the skin 12 to the associated structure 14 using the fastener 10. As illustrated in FIG. 1, the fastener 10 can comprise an elongated "pin" or shaft 16, a head 18 disposed concentrically at an upper end of the shaft 16, and lock nut or "collar" 20 having an internal thread that engages a complementary external thread disposed on a lower end portion 22 of the shaft 16. The shaft 16 and head 18 typically comprise an electroconductive metal, e.g., steel, aluminum, titanium or an alloy of the foregoing.

In a typical assembly procedure, the skin 12 and the associated structure 14 are temporarily clamped tightly together, and a common hole is bored through the two parts. In the particular example embodiment of FIG. 1, the head 18 of the fastener 10 is frustoconical in shape, i.e., intended to be countersunk below the upper surface of the skin 12, such that the upper surface of the head 18 is disposed generally flush with the upper surface of the skin 12, for streamlining purposes, and accordingly, the formation of the hole can include, or be followed by, the formation of a correspondingly shaped frustoconical counterbore in the skin 12 at the upper end of the hole. As illustrated in detail A of FIG. 1, the elongated shaft 16 of the fastener 10 is inserted into the hole until the head 18 of the fastener 10 is seated within the corresponding counterbore, and the nut or collar 20 is then started onto the lower end 22 of the shaft 16.

As illustrated in detail B of FIG. 1, a "wrenching element" 24 disposed on the outer end of the collar 20 is then engaged and rotated by an installation tool (not illustrated) to advance the collar 20 upward along the shaft 16 and toward a lower surface of the associated structure 16, as indicated by the arrow 26, while the shaft 16 is prevented from rotating by the engagement of a socket 27 in the lower end of the shaft 16 with the installation tool. The wrenching element 24 is integrally coupled to the collar 20 through a stress-raising feature 28, such as a notch or groove. As illustrated in detail C of FIG. 1, continued rotation of the wrenching element 24 and collar 20 relative to the fixed shaft 16 with the installation tool eventually drives the upper end of the collar 20 into engagement with the lower surface of the structure 14 with a preselected amount of clamping force, at which point, the collar 20 becomes swaged into a locked position on the shaft 16 and against the associated structure 14, while the wrenching feature 24 is sheared away from the collar 20 at the stress-raising feature 28 and subsequently discarded. Thus, in an installed state, a portion of the shaft 16 disposed below the lower surface of the head 18 and above the upper end of the nut or collar 20 is loaded in a preselected amount of tension, while the skin 12 and the associated structure 14 are pressed together by the fastener 10 with a corresponding amount of compressive force.

In another known type of lock-bolt fastener that does not involve rotation of the collar 20 relative to the shaft 16, such as a HUCK fastener (not illustrated), the shaft 16 can comprise a breakaway extension, or "pin-tail," disposed on a lower end of the shaft 16 that is gripped by an installation tool and pulled axially outward relative to the collar 20, such that the collar 20 is forced axially over a series of thread-like corrugations on the circumfery of the lower end of the shaft 16 and into a compressive engagement with the lower surface of the structure 16. As above, when a pre-selected amount of compressive force on the skin 12 and associated structure 14 has been reached, the collar 20 becomes swaged onto the shaft 16 and against the associated structure 14 in a locked position, and the pin-tail on the shaft 16 is sheared away and discarded.

Another type of conventional aircraft skin fastener 10 commonly used in lighter aircraft applications is a rivet, which, like the lock-bolts described above, comprises an elongated shaft 16 and a head 18, but which omits a nut or collar 20 in favor of a radial expansion of the lower end portion 22 of the shaft 16 as a technique for compressing the skin 12 and the associated structure 14 together, which expansion can be effected through a variety of well-known mechanisms.

While the first embodiment of skin fastener of FIGS. 3A, 3B and 4 can provide good protection against lightning-induced EME-related damage to interior spaces within aircraft having conventional metal, e.g., aluminum alloy, skins, its use, like that of the conventional fastener of FIGS. 1 and 2, may be contraindicated in some aircraft with composite skins, i.e., skins made of laminated sheets of carbon fibers embedded in a relatively soft, dielectric polymer-resin matrix, because the elongated, relatively hard shafts of the fasteners can have a tendency to gall or seize when inserted into the corresponding bores formed in the skins to receive them, resulting in a deformation of the bore and an abrading-away of the relatively softer material of the composite skin into the interface between the fastener and the skin.

However, as illustrated in FIG. 5, it is known that this problem with composite-skinned aircraft can be successfully addressed by the provision of a complementary, thin-walled, metal sleeve 244 disposed concentrically around the shaft 216 and below the head 218 of each fastener 200. The sleeve 244, which can include an upper end portion 246 that is complementary in shape to the head 218, can be inserted into the corresponding bore in the aircraft skin before the body of the associated fastener 200 is inserted therein. The thin wall of the sleeve 244 enables it to deform radially inward when being inserted into the corresponding bore, rather than galling the adjacent skin. The body of the fastener 200, i.e., the shaft 216 and the head 218, can then be inserted into the relatively hard sleeve 344 without galling.

Many skin fasteners like those described above and currently used in commercial airplanes are not designed for problems caused by lightning strikes because they do not allow for the safe escape to the atmosphere of superhot EME-related gases and particles that can be generated in the interfaces between respective ones of the fasteners and the aircraft skin surrounding them. This can be critically important in locations near or within the wing tanks of aircraft, where a lightning strike could result in a particularly undesirable outcome, and this is true whether the aircraft skin comprises a metal, e.g., an aluminum alloy, or a composite material, such as a carbon-fiber/resin layup. Thus, while there are designs for accommodating lighting strikes in airplanes, alternative or additional systems are needed.

Prior art efforts have attempted to address the problem, for example, by insulating the upper surfaces of the fasteners with a layer of a dielectric material, by making all or a portion of the fasteners themselves of a dielectric material, or by encapsulating the lower end portions of the fasteners in a dielectric material. While these efforts in some cases have met with some measure of success, none provides for the venting to the atmosphere of pressurized, superhot EME-related gases and particles resulting from a lightning strike, while simultaneously blocking the flow of those gases and particles to interior spaces of the aircraft.

Accordingly, a long-felt but as yet unsatisfied need exists in the industry for aircraft skin fasteners that are strong, reliable and cost effective as conventional fasteners, yet which also provide robust protection against EME damage to interior spaces of an aircraft, including metal- and composite-skinned aircraft, resulting from lightning strikes.

SUMMARY

In accordance with the present disclosure, embodiments of aircraft skin fasteners are provided that are strong, reliable and cost effective, and which also provide robust protection against EME-related internal damage to aircraft, including metal- or composite-skinned aircraft, resulting from lightning strikes.

In one example embodiment, a fastener comprises an elongated shaft and a head disposed at an upper end of the shaft. The shaft includes a plurality of grooves disposed around a circumfery thereof. Each groove extends upwardly to and radially outward along a lower surface of the head and terminates at an outer periphery of the lower surface. Each groove has a lower end disposed above a lower end portion of the shaft.

In another example embodiment, a fastener for attaching an aircraft skin to an associated structure comprises an elongated shaft having a head disposed at an upper end thereof, one, the other, or both of the shaft and the head containing a groove disposed proximate to an intersection of the shaft and the head, a lower surface of the head including a plurality of grooves extending radially outward from the groove and terminating at an outer periphery of the lower surface. A tubular sleeve having a plurality of through-slots disposed therein is disposed concentrically about the shaft. Each through-slot has a lower end disposed above a lower surface of the skin or the associated structure, and an upper end that is disposed in fluid communication with the groove of the shaft.

In yet another example embodiment, a method for protecting interior spaces of the aircraft from EME-related damage resulting from lightning strikes to the aircraft comprises attaching a skin of the aircraft to an associated structure by a plurality of elongated fasteners, and providing a plurality of elongated channels in interfaces between each fastener and the aircraft skin disposed adjacent thereto. Each channel has a closed lower end disposed above a lower surface of the aircraft skin or the associated structure and an open upper end disposed at an upper surface of the skin so as to vent superheated EME-related gases and particles harmlessly from the channel to the surrounding atmosphere.

A more complete understanding of the aircraft skin fasteners of the present invention, together with the novel methods for making and using them, as well as a realization of additional advantages thereof, will be afforded to those of skill in the art by a consideration of the following detailed description of one or more example embodiments thereof. Reference will be made to the various figures of the appended sheets of drawings, which are briefly described below, and within which like reference numerals are used to identify like ones of the elements illustrated therein.

BRIEF DESCRIPTION OF THE SEVERAL VIEWS OF THE DRAWINGS

FIG. 2 is a diagrammatic representation of a partial cross-sectional view of the conventional aircraft skin fastener of FIG. 1, shown attaching an aircraft skin to an associated structure and experiencing a lightning strike;

FIG. 3A is a diagrammatic representation of a side elevation view of an example embodiment of a lightning damage resistant aircraft skin fastener in accordance with the present disclosure;

FIG. 3B is a diagrammatic representation of a cross-sectional view of the example skin fastener of FIG. 3A, as seen along lines 3B-3B;

DETAILED DESCRIPTION

Figure 1:
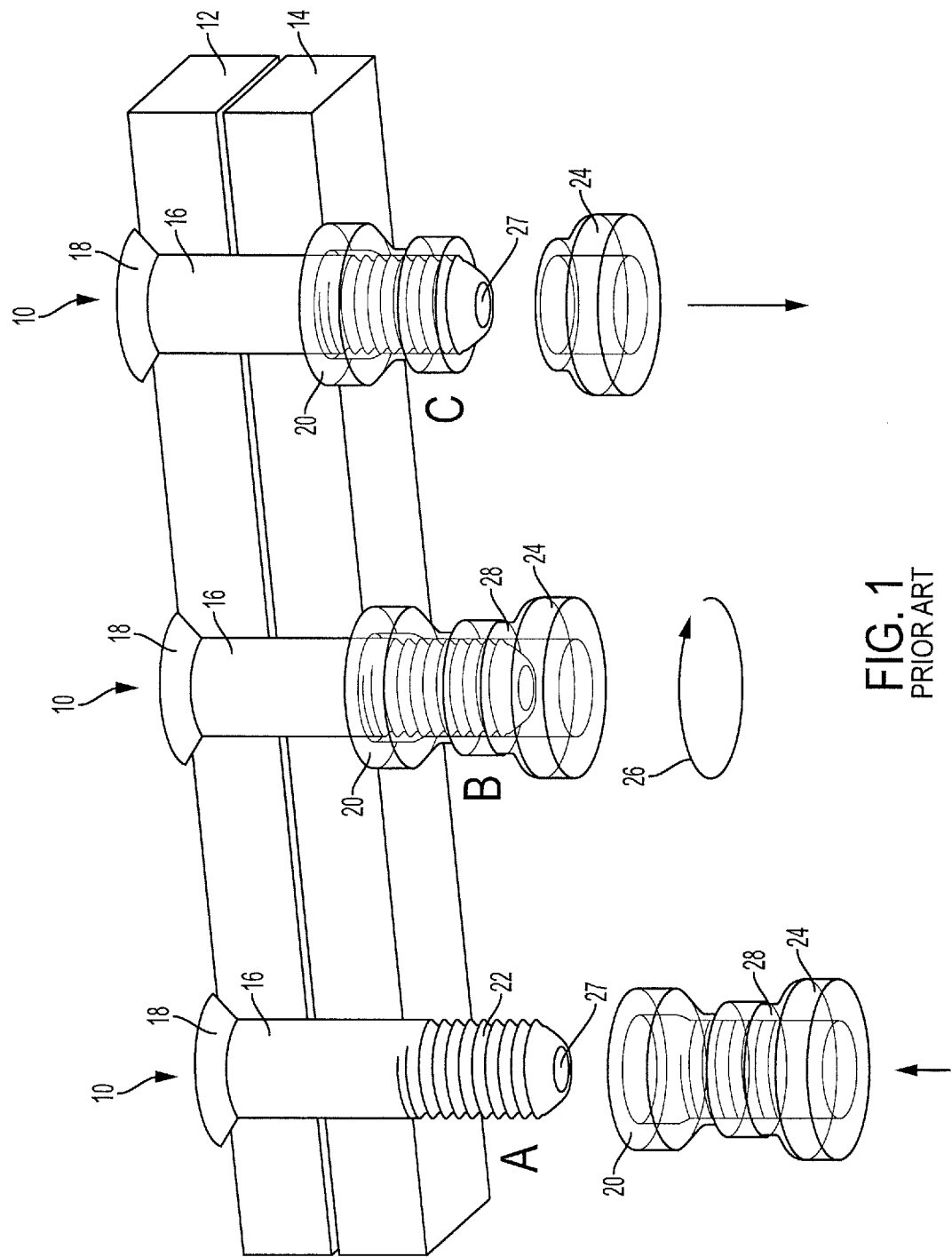
FIG. 1 is a diagrammatic representation of a lower, side perspective view illustrating sequential steps involved in attaching an aircraft to associated structure using a conventional lock bolt fastener.

In accordance with the present disclosure, various embodiments of aircraft skin fasteners are provided, together with methods for making and using them, that are strong, reliable and cost effective, and which also provide robust protection against EME-related interior damage to aircraft, including metal- or composite-skinned aircraft, resulting from lightning strikes.

It is generally accepted that both metal (typically aluminum alloy) and composite (typically, carbon- or graphite-fiber-and-epoxy-resin matrices) structural components currently being incorporated into the bodies of advanced aircraft will eventually be subjected to naturally occurring lightning discharges, or "strikes," during flight. In a typical lightning strike incident, the lightning strikes, or "attaches," at one extremity of an aircraft, and departs, or "detaches," from another extremity, resulting in a very large, momentary flow of electrical current through the body of the aircraft between the two points.

The more severe, or "primary," strikes tend to attach to and detach from the body of the aircraft at features that are located at or near protuberances located at the extremities of the body (e.g., the nose, tips and leading edges of wings, stabilizers, vertical fins and rudders, engine nacelles, and the trailing edges of rudders, elevators, and ailerons), and are characterized by a fast-rising, high-peak current ($2 \times 10^5$ amp) and a large energy transfer density ($25 \times 10^6$ amp$^2$ sec) having frequency components of from between about 1 kHz to about 1 MHz. These strikes can cause severe structural damage to aircraft structures and their contents if the energy of the strike is not efficiently conducted through the outer skin of the aircraft without damage.

Additionally, other "secondary" parts of the structure, located between the typical primary attachment and detachment points, can be subjected either to primary, or to lesser discharges, referred to as "swept-stroke" lightning strikes. The latter are characterized by a fast-rising current having the same frequency spectrum as above, but with $1 \times 10^5$ amp peaks and energy transfer densities of $0.25 \times 10^6$ amp$^2$ sec, and can also result in severe structural damage to unprotected structures.

The skin of an aircraft typically comprises a plurality of panels that abut one another at seams, and which are attached to associated structure, such as ribs, spars, longerons, frames, stringers and the like, by fasteners, such as lock bolts or rivets. The problem can be exacerbated in aircraft with composite skin panels because the energy of the strike is not conducted through the composite material efficiently, due to its relatively lower thermal and electrical conductivities. Therefore, to prevent or reduce damage to a composite aircraft resulting from either type of strike, it can be desirable to connect the attachment and detachment points of the strike with a continuous, highly electroconductive path that is capable of carrying a momentary, high-density electrical current without damage, such that the electrical current of the strike is substantially diverted through the conductive skin path, rather than through other portions of the aircraft that cannot tolerate such a current flow without damage. The problem, although still present, is substantially reduced in aircraft with metal, i.e., highly electroconductive, skin panels.

A system for protecting a composite-skinned aircraft from damage caused by lightning strikes is described in U.S. Pat. No. 7,554,785 to A. V. Hawley, incorporated herein by reference in its entirety, and includes the creation of a "Faraday cage" on the exterior surface of the aircraft body by the provision of a continuous, electroconductive grid that extends to the outermost lateral periphery of the body. The conductive grid provides preferential attachment points and conductive paths for lightning strikes on the surface of the aircraft, thereby shielding the interior of the grid from lightning damage. A similar result is obtained in a metal-skinned aircraft, provided that adjacent skin panels are electroconductively coupled to each other in an effective manner.

However, even if such protective measures are undertaken, the fasteners used to attach the aircraft's skin to associated structure, which are typically electroconductive, can comprise a weak link in the "Faraday cage" of the aircraft's skin, because of the penetrating discontinuities that they introduce into the skin of the cage. In particular, some lightning strikes can produce a high-energy electrical arc at the interface between a fastener and the surrounding aircraft skin, which can result in the production of superheated gases and particles within the interface that, if not effectively blocked or safely vented to the atmosphere, can penetrate downward along the interface and into interior spaces within the aircraft.

FIG. 2 is partial cross-sectional view of the conventional aircraft skin fastener 10 of FIG. 1, shown attaching an aircraft skin 12 to an associated structure 14, and experiencing a lightning strike, as indicated by the lightning "bolt" 30. As those of some skill will understand, although the shaft 16 and head 18 can be sized to fit as closely as practical within the corresponding bore and countersink in the skin 12, one or more discontinuities or gaps can still exist within the interface 32 between the fastener and the surrounding skin 12, even if only at a microscopic level.

As discussed above, the high voltage and current imposed on and through the fastener 10 and skin 12 by a lightning strike 30 produces high current density at contact points across these gaps which can result in the generation of superheated gases, e.g., superheated microscopic combustion particles of, e.g., paint, primer, lubricants, and skin material, such as metal, carbon fibers, resin, and the like, within the interface 32, together with an attendant elevated pressure. As illustrated in FIG. 2, these high-pressure, superheated gases and particles 34 can then be forced upwardly and/or downwardly within the interface 32 and be exhausted therefrom at the upper and/or lower ends of the interface 32.

Thus, as indicated by the arrow 36 in FIG. 2, the superheated gases and particles 34 can be vented harmlessly upward to the atmosphere above the skin 12. However, as indicated by the arrow 38 in FIG. 2, the superheated gases and particles 34 can additionally (or alternatively) be vented from a lower end of the interface 32 downward and into an interior space of the aircraft disposed around the lower end portion 22 of the fastener 10, e.g., within the interior of a fuel tank, with potentially undesirable consequences.

Prior art efforts aimed at preventing the latter occurrence have mainly been directed toward 1) preventing the occurrence of electrical arcs within the interface 32, or 2) blocking the exit of the superheated gases and particles 34 from the lower end of the interface 32, e.g., with a dielectric gasket, or by encapsulating the collar 20 and lower end portion 22 of the shaft 16 with a dielectric material.

However, the present disclosure contemplates another solution, namely, providing a path of relatively low resistance for the venting of the superhot EME-related gases and particles 34 upwardly to the atmosphere surrounding the upper surface of the skin 12, while simultaneously impeding their downward flow into the interior spaces of the aircraft. This can be effected, for example, by providing a plurality of elongated channels within the interface 32, each having a closed lower end disposed above a lower surface of the skin 12 or the associated structure 14, and an open end disposed at the upper surface of the skin 12 so as to preferentially vent the EME-related gases and particles 34 from the channels and into the atmosphere.

Figure 4:
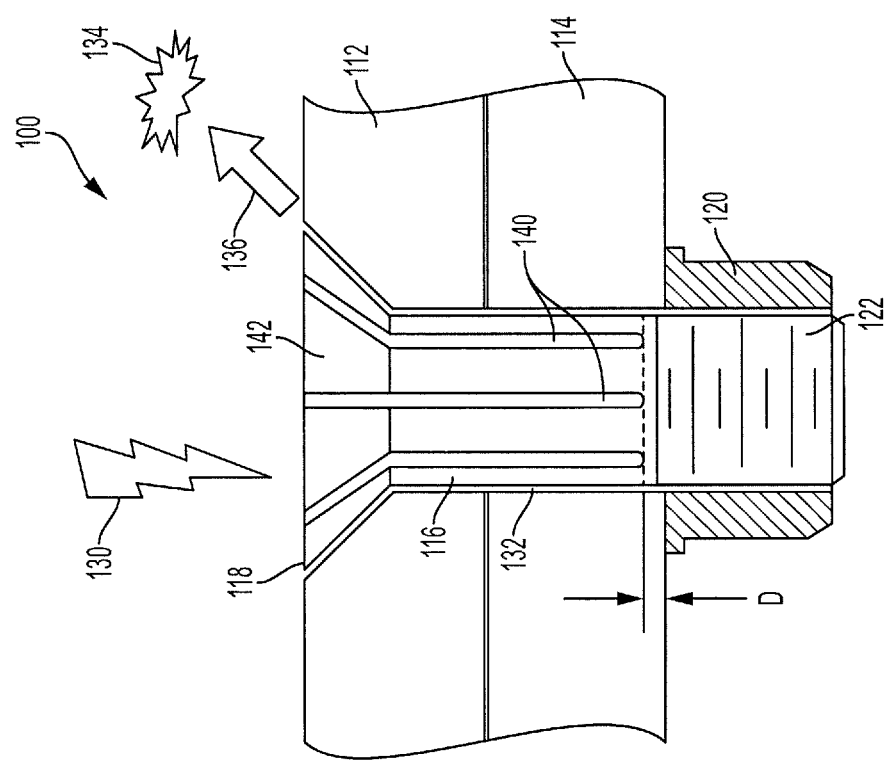
FIG. 4 is a diagrammatic representation of a partial cross-sectional view of the example skin fastener of FIGS. 3A and 3B, shown attaching an aircraft skin to associated structure and experiencing a lighting strike.

FIG. 3A is side elevation view of a first example embodiment of a lightning damage resistant aircraft skin fastener 100 capable of effecting the foregoing "preferential venting" technique, and FIG. 3B is a cross-sectional view of the fastener 100, as seen along the lines of the section 3B-3B taken in FIG. 3A. FIG. 4 is a partial cross-sectional view of the example skin fastener 100, shown attaching an aircraft skin 112 to an associated structure 114, and experiencing a lighting strike 130. As can be seen in FIGS. 3A, 3B and 4, the example fastener 100, like the conventional fastener 10 of FIGS. 1 and 2, includes an elongated shaft 116 and a head 118 disposed at an upper end of the shaft 116.

In the particular example fastener 100 illustrated in FIG. 4, the tightening mechanism disposed at the lower end 122 of the shaft 116 comprises a threaded collar 120, and the head 118 is frustoconical in shape for countersinking below the upper surface of the skin 112, as discussed above. However, it should be understood that the functioning of the novel venting features described below are independent of both the type of tightening mechanism and the shape or installation position of the head 118 of the fastener. Thus, for example, in some embodiments, the head 118 of the fastener 100 could comprise, e.g., a conventional "pan-head" that is disposed below or on top of the upper surface of the skin 114 when installed.

As can be seen in, e.g., FIGS. 3A and 3B, the elongated shaft 116 of the fastener 100 includes a plurality of longitudinal grooves 140 disposed around a circumfery thereof. Each of the grooves 140 extends upwardly to, and radially outward along, a lower surface 142 of the head 118, and terminates at an outer periphery of the lower surface 142 of the head 118, and each groove 140 has a lower end that is disposed above the lower end portion 122 of the shaft 116, or even higher, e.g., above a lower surface of the aircraft skin 112, or anywhere in between. In this regard, it should be understood that, as discussed above, the current flowing through the body of an aircraft as the result of a lightning strike 130 is confined substantially to the skin 112 of the aircraft, and accordingly, substantially all of the arcing that takes place in the periphery 132 between the body of the fastener 100 and the skin 112, as well as the superheated products 134 resulting therefrom, occur within the thickness of the skin 112.

Thus, in some embodiments, the lower ends of the grooves 140 can be disposed slightly above the lower surface of the skin 112. However, as illustrated in FIG. 4, in some embodiments, it may be desirable, e.g., for manufacturability reasons, to make the grooves 140 longer, such that the lower ends of the grooves 140 are disposed at a distance D that is slightly above the lower surface of the associated structure 114. In either case, as discussed above, the lower ends of the grooves 140 function to block the flow of the superheated gases and particles 134 downward to the lower end of the periphery 132, while the upper ends of the grooves 140 function to provide openings through which the superheated gases and particles 134 can vent harmlessly to the atmosphere.

The number and the cross-sectional shape and area of the grooves 140 can vary widely, depending on the particular application at hand, and can be formed in the body of the fastener 100 using a variety of techniques, including, for example, extruding, upset die-forming, casting, machining and roll-forming. All other things being equal, the greater the volume being vented to the atmosphere, the better the venting.

Figure 5:
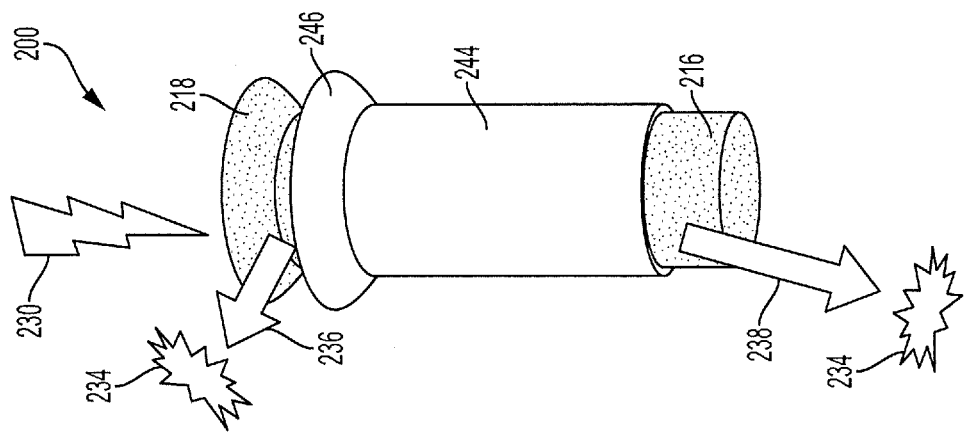
FIG. 5 is a diagrammatic representation of a lower, side perspective view of a conventional sleeved skin fastener of a type used to attach a composite aircraft skin to associated structure, shown during a lightning strike.

While the "sleeved fastener" approach of FIG. 5 can eliminate the galling problem in composite-skinned aircraft, it is subject to the same vulnerability to EME-related lightning strike damage as the conventional fastener 10 of FIGS. 1 and 2. In particular, the addition of the sleeve 244 creates a second interface between the body of the fastener 200 and the adjacent skin, i.e., one between the outer surface of the fastener body and the inner surface of the sleeve 244, and one between the outer surface of the sleeve 244 and the surrounding skin of the aircraft, within which, in response a lightning strike 230, lighting-induced arcing and the concomitant generation of pressurized, superhot gases and particles 234 can occur. And, as illustrated in FIG. 5 and described above in connection with the conventional fastener 10 of FIG. 2, these superhot arcing products 234 can, under the appropriate conditions, exit the two interfaces at their respective upper and lower ends, i.e., harmlessly upwards or undesirably downwards, as respectively indicated by the arrows 236 and 238.

Accordingly, as discussed above in connection with the first fastener embodiment 100, it is desirable to provide a preferential venting of the superhot EME-related gases and particles 234 upwardly to the atmosphere surrounding the upper or outer surface of the skin, while simultaneously impeding their downward flow into the interior spaces of the aircraft.

Figure 6C:
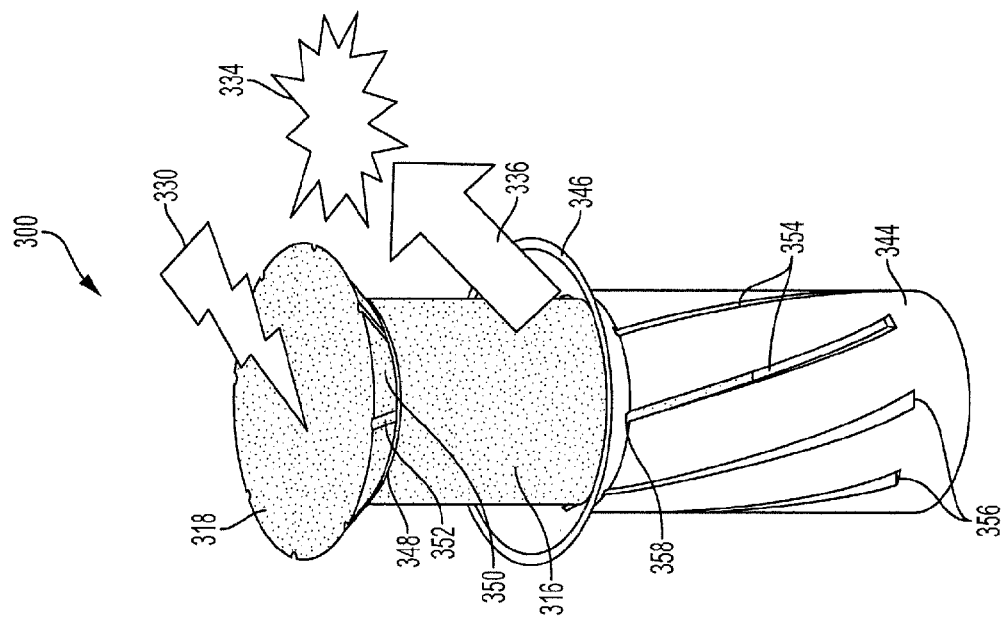
FIG. 6C is a diagrammatic representation of an upper perspective view of the example sleeved aircraft skin fastener, shown during a lightning strike.
Figure 6B:
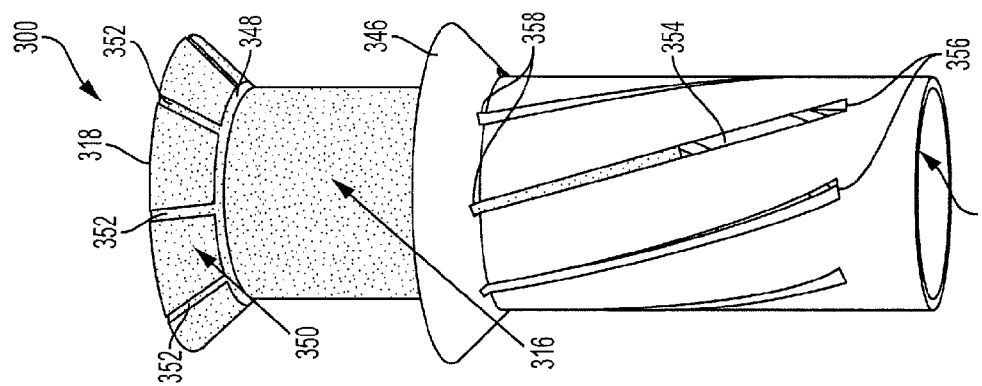
FIG. 6B is a diagrammatic representation of a lower perspective view of the example sleeved aircraft skin fastener of FIG. 6A.
Figure 6A:
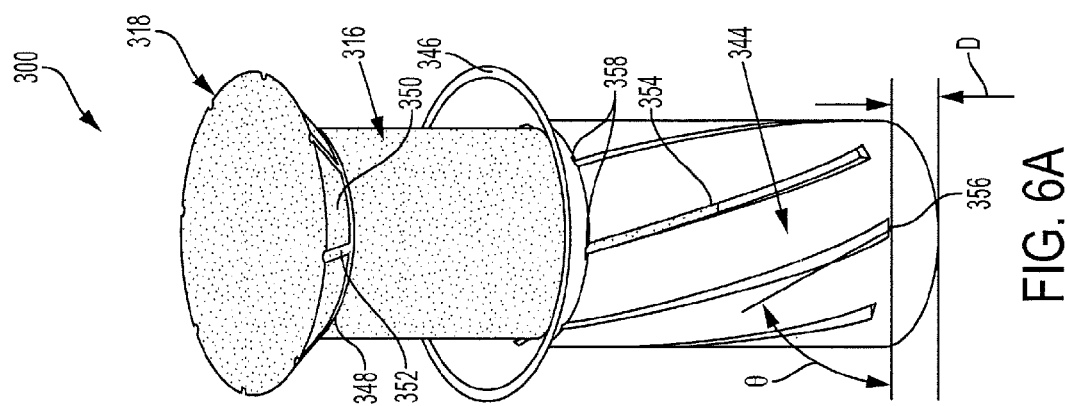
FIG. 6A is an upper, side perspective view of an example embodiment of a lightning damage resistant sleeved aircraft skin fastener in accordance with the present disclosure.

A second example embodiment of a sleeved fastener 300 for attaching a composite aircraft skin to an associated structure while providing resistance to lighting-induced EME-related damage in accordance with the present disclosure is illustrated in FIGS. 6A-6C, wherein the tensioning feature, e.g., a locking nut or threaded collar of the fastener 300, has been omitted for purposes of illustration. As can be seen in these figures, the fastener 300 comprises an elongated shaft 316 having a circumferential groove 348 disposed proximate to an intersection of the shaft 348 and a lower surface 350 of a head 318 located at an upper end of the shaft 316. In the particular example embodiment illustrated, the head 316 is frustoconical for countersinking purposes, but as discussed above, the shape of the head 316, whether it is countersunk or not, and the technique used at the lower end to compress the skin and associated structure together with the fastener 300 are unrelated to the venting function of the EME-related damage resistant features of the fastener 300.

As illustrated in, e.g., FIG. 6B, the lower surface 350 of the head 318 includes a plurality of grooves 352 extending radially outward from the circumferential groove 348 and terminating at an outer periphery of the lower surface 350 of the head 318, i.e., at the intersection of the lower surface 350 of the head 318 and the upper surface of the head 318. A relatively thin-walled tubular sleeve 344 is disposed concentrically about the shaft 316 and has a plurality of helically extending through-slots 354 disposed therein. Each of the through-slots 354 has a lower end 356 and an upper end 358 in fluid communication with the circumferential groove 348 in the shaft 316 when the body of the fastener is fully seated within the sleeve 344. As discussed above, the lower ends 356 of the through-slots 354 can be located either slightly above a lower surface of the aircraft skin, or in an alternative embodiment, at a distance D slightly above a lower end of the sleeve 344, as illustrated in FIG. 6A. Similar to the sleeve 244 of the conventional sleeved fastener 200 of FIG. 5, the sleeve 344 can include a funnel-shaped upper end portion 346 that is complementary in shape to the head 318.

As may be noted in the figures, the through-slots 354 in the sleeve 344 extend helically upward in the sleeve 344 from their lower ends 356 at a helical angle of θ, rather than generally vertically, as in the case of the longitudinal grooves 140 of the first embodiment 100 above. As those of some skill will understand, a composite aircraft skin typically comprises a "layup" of a plurality of layers, each of which includes a planar arrangement of electroconductive fibers, e.g., carbon fibers, that are intentionally disposed at different angular orientations relative to those of the other layers, for example, at 0 degrees, 45 degrees, 90 degrees, 135 degrees, and so on, for reasons of strength. Thus, the fibers, through which the electrical current resulting from a lightning strike flow, intersect the bore of the fastener 300 at a plurality of discrete angles. By arranging the through-slots 354 helically, the effective width of the slots that are disposed in opposition to respective ones of the layers of fibers is increased, relative to through-slots 354 that are disposed longitudinally, i.e., orthogonally to the fiber layers.

The circumferential groove 348 functions in the manner of an exhaust "collector," "header," or "manifold," in that it serves to receive or collect the superhot EME-related gases and particles 334 from each of the through-slots 354 in the sleeve 344, and then conveys them into the plurality of grooves 352 in the lower surface 350 of the head 316, such that they vent from the grooves 352 and into the atmosphere at the upper surface of the aircraft skin. Thus, and depending on its particular shape, the groove 348 can be disposed almost entirely within the circumfery of the shaft 316 of the fastener 300, almost entirely within the lower surface 350 of the head 318 of the fastener 300, or at a position intermediate those two positions, provided only that the continuity of the venting paths from the through-slots 354 to the circumferential groove 348, and thence, from the circumferential groove 348 to the radial grooves 352, is maintained.

As illustrated in FIG. 6C, the operation of the fastener 300 during a lightning strike 330 is similar to that of the first embodiment of fastener 100 above, except for the function of the slotted-walled sleeve 344. Thus, the superhot EME-related gases and particles 334 generated in the interfaces between the body of the fastener 300 and the sleeve 344, and between the sleeve 344 and the skin surrounding them expands preferentially into the through-slots 354, then upwardly and into the circumferential groove 348 disposed proximate to the intersection of the shaft 348 and the lower surface 350 of the head 318, and thence, through the radial grooves 352 in the lower surface 350 of the head 318 and into the atmosphere above the upper surface of the aircraft skin.

As in the first example fastener 100 described above, the number, width and helical angle θ of the through-slots 354 can vary widely, depending on the particular application at hand, and the sleeve 344 can be manufactured using a variety of known fabrication techniques. As above, the greater the volume defined by the through-slots 354 being vented to the atmosphere, the greater is the venting protection afforded.

Other configurations are also contemplated. For example, although grooves 140 and 352 are generally illustrated as longitudinal in shape (e.g., straight), and through-slots 354 are generally illustrated as helical in shape (e.g., curved), other configurations may be used. For example, any of grooves 140, grooves 352, through-slots 354, and/or related features may be implemented as longitudinal and/or helical in shape as appropriate in various embodiments.

As those of some skill in this art will by now appreciate, and depending on the particular application at hand, many modifications, substitutions and variations can be made in and to the materials, apparatus, configurations and methods of making and using the lightning damage resistant aircraft skin fasteners of the present disclosure without departing from the spirit and scope thereof. In light of this, the scope of the present invention should not be limited to those of the particular embodiments illustrated and described herein, as they are merely by way of some examples thereof, but rather, should be fully commensurate with that of the claims appended hereafter and their functional equivalents.

What is claimed is:

1. A fastener for attaching an aircraft skin to an associated structure, the fastener comprising:
    an elongated shaft having a head disposed at an upper end thereof, one, the other, or both of the shaft and the head containing a circumferential groove disposed at or adjacent to an intersection of the shaft and the head, a lower surface of the head including a plurality of grooves extending radially outward from the circumferential groove and terminating at an outer periphery of the lower surface; and
    a tubular sleeve disposed concentrically about the shaft and having a plurality of through-slots disposed therein, each through-slot having a lower end and an upper end in fluid communication with the circumferential groove of the shaft.

2. The fastener of claim 1, wherein the fastener is configured such that, when the fastener is installed in an opening through the aircraft skin and associated structure, the lower end of each through-slot is disposed above a lower surface of the associated structure.

3. The fastener of claim 1, wherein the lower end of each slot is disposed above a lower end of the sleeve.

4. The fastener of claim 1, wherein the head is frusto-conical in shape, and the sleeve includes an upper end portion that is complementary in shape to the head.

5. The fastener of claim 1, further comprising a nut having an internal thread disposed in engagement with a complementary external thread on a lower end portion of the shaft.

6. The fastener of claim 1, wherein the skin comprises a composite of electroconductive fibers embedded in a dielectric resin matrix.

7. A method for protecting interior spaces of an aircraft from electromagnetic effect (EME) related damage resulting from lightning strikes to the aircraft, the method comprising:
    attaching a skin of the aircraft to an associated structure of the aircraft by a plurality of elongated fasteners; and
    providing a plurality of elongated channels in an interface between each fastener and the aircraft skin disposed adjacent thereto, each channel having a closed lower end and an open end disposed at an upper surface of the skin so as to vent EME-related gases and particles from the channel to the atmosphere.

8. The method of claim 7, wherein the providing comprises:
    providing an elongated shaft having an outer surface and a head disposed at an upper end of the shaft, the head having a lower surface intersecting the outer surface of the shaft; and
    forming a plurality of longitudinally extending grooves in the outer surface of the shaft of the fastener, each groove extending continuously upward to and radially outward along the lower surface of the head of the fastener and terminating at an outer periphery of the lower surface of the head.

9. The method of claim 8, wherein the skin comprises a metal.

10. The method of claim 7, wherein the providing comprises:
    providing an elongated shaft having an outer surface and a head disposed at an upper end of the shaft, the head having a lower surface intersecting the outer surface of the shaft at an intersection;
    forming a circumferential groove at the intersection of the outer surface of the shaft of the fastener and the lower surface of the head;
    forming a plurality of grooves in the lower surface of the head, the grooves extending radially outward from the circumferential groove and terminating at an outer periphery of the lower surface of the head; and forming a plurality of through-slots in a sleeve disposed concentrically about the shaft, each through-slot having a lower end disposed above a lower surface of the skin or a lower end of the sleeve and an upper end disposed in communication with the circumferential groove of the shaft.

11. The method of claim 10, wherein the skin comprises a composite of electroconductive fibers embedded in a dielectric resin matrix.

12. An aircraft, comprising:
a structural member having an inner surface and an outer surface;
a skin disposed on the outer surface of the structural member; and
a fastener fastening the skin to the structural member, the fastener comprising:
an elongated shaft having an outer surface and a plurality of grooves extending longitudinally along the shaft; and
a head disposed at an upper end of the shaft, the head having a lower surface intersecting the outer surface of the shaft, wherein
each of the plurality of grooves extends continuously upward to and radially outward along the lower surface of the head and terminates at an outer periphery of the lower surface of the head, and
each of the plurality of grooves has a lower end disposed above the inner surface of the structural member.

13. The aircraft of claim 12, further comprising a fuel tank disposed within the aircraft, wherein a lower end portion of the fastener is disposed within the fuel tank.

14. The aircraft of claim 12, wherein the structural member comprises a rib, a spar, a stringer, a longeron, or a frame.

15. The aircraft of claim 12, wherein the head of the fastener is frusto-conical in shape.

16. The aircraft of claim 12, further comprising a collar having an internal thread disposed in engagement with a complementary external thread on a lower end portion of the shaft and tensioning a portion of the shaft disposed below the head and above the lower end portion of the shaft.

17. The aircraft of claim 12, wherein at least one of the shaft and the head of the fastener comprises a metal.

18. A method, comprising;
fastening a skin on an outer surface of a structural member of an aircraft with a fastener, the fastener comprising:
an elongated shaft having an outer surface and a plurality of grooves extending longitudinally along the shaft; and
a head disposed at an upper end of the shaft, the head having a lower surface intersecting the outer surface of the shaft, wherein
each of the plurality of grooves extends continuously upward to and radially outward along the lower surface of the head and terminates at an outer periphery of the lower surface of the head, and
each of the plurality of grooves has a lower end disposed above an inner surface of the structural member.

19. The method of claim 18, further comprising pulling the skin and the structural member together using a collar having an internal thread disposed in engagement with a complementary external thread disposed on a lower end portion of the shaft.

20. The method of claim 18, wherein at least one of the skin and the structural member comprises an electroconductive metal.

21. The method of claim 18, wherein the structural member comprises a rib, a spar, a stringer, a longeron, or a frame.

* * * * *